United States Patent
Kotenkoff et al.

(10) Patent No.: US 9,921,944 B2
(45) Date of Patent: Mar. 20, 2018

(54) METHOD AND SYSTEM FOR ASSISTING IN THE VERIFICATION AND VALIDATION OF AN ALGORITHM CHAIN

(71) Applicant: MBDA FRANCE, Le Plessis-Robinson (FR)

(72) Inventors: Alexandre Kotenkoff, Fontenay-aux-Roses (FR); David Vigouroux, Le Plessis-Robinson (FR); Antoine Vivares, Paris (FR); Olivier Hebert, Paris (FR); Christophpe Perel, Vanves (FR)

(73) Assignee: MBDA France, Le Plessis-Robinson (FR)

( * ) Notice: Subject to any disclaimer, the term of this patent is extended or adjusted under 35 U.S.C. 154(b) by 0 days.

(21) Appl. No.: 15/102,242

(22) PCT Filed: Dec. 3, 2014

(86) PCT No.: PCT/FR2014/000258
§ 371 (c)(1),
(2) Date: Jun. 6, 2016

(87) PCT Pub. No.: WO2015/086916
PCT Pub. Date: Jun. 18, 2015

(65) Prior Publication Data
US 2016/0314059 A1    Oct. 27, 2016

(30) Foreign Application Priority Data
Dec. 10, 2013   (FR) ..................... 13 02881

(51) Int. Cl.
*G06F 9/44*      (2006.01)
*G06F 11/36*     (2006.01)
(Continued)

(52) U.S. Cl.
CPC ...... *G06F 11/3636* (2013.01); *G06F 11/3692* (2013.01); *G06N 99/005* (2013.01);
(Continued)

(58) Field of Classification Search
CPC ............. G06F 11/3636; G06F 11/3466; G06F 9/44589; G06F 11/3688; G06F 11/3409;
(Continued)

(56) References Cited

U.S. PATENT DOCUMENTS 9,158,639 B2 * 10/2015 Hu .......................... G06F 11/26
9,223,553 B2 * 12/2015 Venkatasubramanian G06F 11/0751

(Continued)

FOREIGN PATENT DOCUMENTS

EP        0 695 990 A2     2/1996

OTHER PUBLICATIONS

Written Opinion of the International Searching Authority dated Feb. 23, 2015, issued in corresponding International Application No. PCT/FR2014/000258, filed Dec. 3, 2014, 10 pages.
(Continued)

*Primary Examiner* — Thuy Dao
*Assistant Examiner* — Ben C Wang
(74) *Attorney, Agent, or Firm* — Christensen O'Connor Johnson Kindness PLLC

(57) ABSTRACT

Method and system for assisting in the verification and validation of an algorithm chain. The system (1) comprises an instrumentation module (2) of an algorithm chain, providing automatic data capture including at least some of the following data: interface data and internal algorithm data of the algorithm chain, a module (3) for automatic verification of functional rules, a learning module (5) for the modelling by learning of the constraints and algorithm criteria of the algorithm chain, and taking account of the validations per-
(Continued)

formed by a human operator, and a module (7) for automatic detection of bugs and functional problems of the algorithm chain using statistical learning means.

7 Claims, 1 Drawing Sheet

(51) Int. Cl.
  *G06N 99/00* (2010.01)
  *G06F 9/445* (2018.01)
  *G06F 11/34* (2006.01)
(52) U.S. Cl.
  CPC ...... *G06F 9/44589* (2013.01); *G06F 11/3409* (2013.01); *G06F 11/3466* (2013.01); *G06F 11/3688* (2013.01)
(58) Field of Classification Search
  CPC ............. G06F 11/3684; G06F 11/3419; G06F 11/3476
  See application file for complete search history.

(56) References Cited

U.S. PATENT DOCUMENTS

| | | | |
|---|---|---|---|
| 9,449,274 B2* | 9/2016 | Randerath | G05B 23/024 |
| 2005/0149505 A1* | 7/2005 | Bossman | G06F 17/30536 |
| 2008/0208777 A1* | 8/2008 | Stephens | G06N 99/005 |
| | | | 706/12 |
| 2009/0282474 A1* | 11/2009 | Chen | G06F 21/53 |
| | | | 726/21 |
| 2009/0328002 A1 | 12/2009 | Lin et al. | |
| 2010/0031347 A1* | 2/2010 | Ohto | G06F 8/65 |
| | | | 726/19 |
| 2010/0169245 A1* | 7/2010 | Basel | G06N 99/005 |
| | | | 706/12 |
| 2010/0281469 A1 | 11/2010 | Wang et al. | |
| 2010/0325620 A1* | 12/2010 | Rohde | G06F 9/44589 |
| | | | 717/154 |
| 2012/0089873 A1 | 4/2012 | Wang et al. | |
| 2012/0151271 A1 | 6/2012 | Ganai | |
| 2012/0311574 A1* | 12/2012 | Song | G06F 11/3003 |
| | | | 718/1 |
| 2013/0326276 A1* | 12/2013 | Hu | G06F 11/26 |
| | | | 714/37 |
| 2014/0040667 A1* | 2/2014 | Zemer | G06F 11/3684 |
| | | | 714/32 |
| 2014/0156570 A1* | 6/2014 | Randerath | G05B 23/024 |
| | | | 706/12 |
| 2014/0279762 A1* | 9/2014 | Xaypanya | G06N 3/08 |
| | | | 706/12 |
| 2014/0281739 A1* | 9/2014 | Tuffs | G06F 11/3452 |
| | | | 714/47.2 |
| 2015/0015366 A1* | 1/2015 | Hoffman | G06Q 10/087 |
| | | | 340/5.61 |
| 2015/0178104 A1* | 6/2015 | Venkatasubramanian | |
| | | | G06F 9/44589 |
| | | | 717/126 |
| 2015/0188715 A1* | 7/2015 | Castellucci | H04L 9/3265 |
| | | | 713/178 |
| 2016/0080243 A1* | 3/2016 | Kodama | H04L 41/0806 |
| | | | 370/252 |
| 2016/0299830 A1* | 10/2016 | Chastain | G06F 9/45558 |
| 2017/0010959 A1* | 1/2017 | Smith | G06F 11/3684 |
| 2017/0270034 A1* | 9/2017 | Cai | G06F 11/3664 |

OTHER PUBLICATIONS

International Preliminary Report on Patentability dated Jun. 14, 2016, issued in corresponding International Application No. PCT/FR2014/000258, filed Dec. 3, 2014, 1 page.

International Search Report dated Feb. 23, 2015, issued in corresponding International Application No. PCT/FR2014/000258, filed Dec. 3, 2014, 6 pages.

* cited by examiner

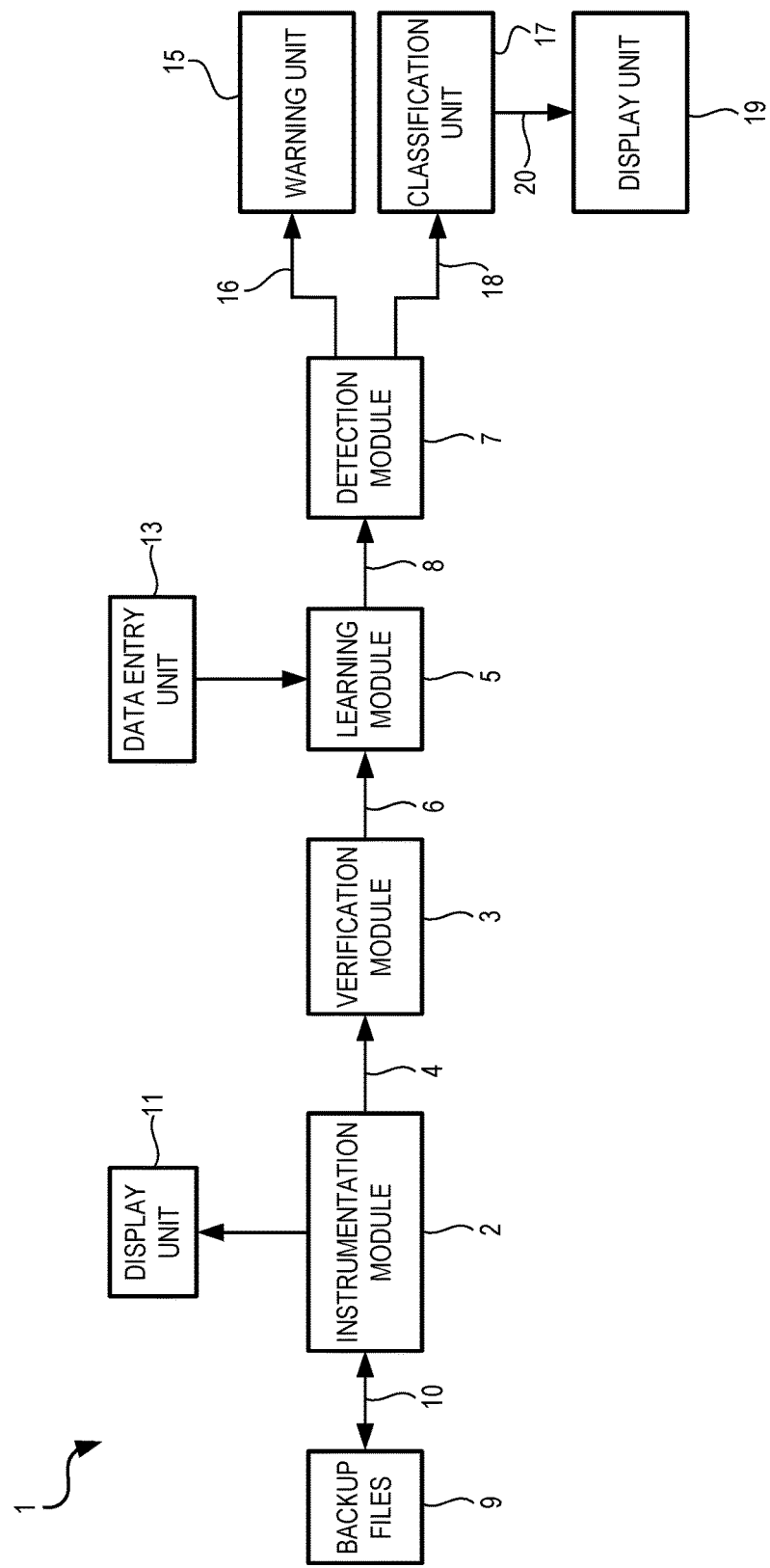

METHOD AND SYSTEM FOR ASSISTING IN THE VERIFICATION AND VALIDATION OF AN ALGORITHM CHAIN

FIELD

The present invention relates to a method and a system for assisting in the verification and validation of an algorithm chain.

Within the scope of the present invention, an algorithm chain is understood to mean a set of algorithms cooperating together and processing a plurality of data in order to implement one or more particular functions, in particular of a user device on which said algorithm chain is loaded.

The present invention can apply to an algorithm chain embedded in a device or projectile, for example on a missile, or even to a non-embedded algorithm chain before it is loaded on a user device.

BACKGROUND

Validation and verification of an algorithm chain (or algorithmic chain) are very complex and costly tasks, in particular because of the many increments that involve the correction of bugs and adjustment of criteria, and because of the many interactions between the different algorithmic modules. This complexity likewise causes a difficulty in scheduling the task of validating and verifying an algorithm chain.

Because of this complexity, human intervention by an operator having in-depth knowledge of the algorithm chain is necessary. Comprehensive verification by a human operator of all the parameters and data to be analysed is a long, tedious or even impossible process.

Furthermore, the operator is not infallible and cannot analyse all the relevant parameters.

SUMMARY

This conventional solution of verifying and validating an algorithm chain being the responsibility of a single human operator is therefore not satisfactory.

The object of the present invention is to overcome this drawback. The present invention relates to a method for assisting the verification and validation of an algorithm chain, providing assistance to a human operator.

To this end, according to the invention, said method is noteworthy in that it comprises:
a) a step of instrumenting the algorithm chain, automatically capturing data that include at least some of the following data: interface data and internal algorithm data of the algorithm chain;
b) a step of automatically verifying functional rules;
c) a learning step for modelling by learning the constraints and algorithm criteria of the algorithm chain, taking into account validations carried out by a human operator, and data captured; and
d) a step of automatically detecting bugs or functional problems in the algorithm chain using statistical learning means.

Said method according to the invention makes it possible to improve and simplify the validation of complex algorithms, such as those used for example in the field of aeronautics. In particular, it makes it possible to assist an operator in detecting the bugs more quickly (specifically design and implementation faults in an algorithm that are shown by anomalies in operation) and operational problems in the verified algorithm chain, which makes it possible for delays in and costs of the functional validation of the algorithm chain to be reduced.

According to the invention, in an earlier step, a data set of the algorithm chain is stored in the backup files and step a) consists in reading said backup files and creating queries about the data contained in said backup files.

Said method also comprises at least some of the following features or steps, taken individually or in combination:
step b) is configured to be able to detect a breach of the rules and to be able to detect if elements have to be verified by an operator;
step c) carries out a data correlation using statistical learning means in order to determine general rules of variations in algorithm outputs of the algorithm chain, and it sends a warning if a variation greater than a given threshold of an algorithm output compared with a predetermined output is detected;
step d) analyses the variation in algorithm results of the algorithm chain so as to detect, where necessary, discontinuities and abnormal variations;
the method comprises an additional step e) of classifying suspect (or problematic) test cases identified;
the method also comprises a step of defining metrics and displaying said metrics.
Advantageously, step c) is further configured
to carry out an analysis of a functional structure of the algorithm chain and an associated code;
to carry out a learning process using the noted test cases that are provided by an operator; and
to identify the relevant and suspect test cases and to present to the operator at least the suspect test cases identified.

The present invention makes it possible in particular:
to more efficiently detect bugs in flows of data that are used by algorithms in the algorithm chain;
to assist an operator responsible for the validation in analysing said data; and
to increase reliability in the validation phase.

The present invention also relates to a system for assisting the verification and operational validation of an algorithm chain.

According to the invention, said system comprises at least the following modules, coordinated by an expert system:
a module for instrumenting the algorithm chain, automatically capturing data that include at least some of the following data: interface data and internal algorithm data of the algorithm chain;
a module for automatically verifying functional rules;
a learning module for modelling by learning the constraints and algorithm criteria of the algorithm chain, taking into account validations carried out by a human operator; and
a module for automatically detecting bugs or operational problems in the algorithm chain using statistical learning means.

Advantageously, said system further comprises:
a set of backup files in which data of the algorithm chain are stored, said instrumentation module being configured to read said backup files and to create queries about the data contained in said backup files; and/or
a unit for displaying data from the instrumentation module; and/or
a data entry unit making it possible for an operator to enter data; and/or
a unit for presenting the results from the module for detecting bugs; and/or a module for classifying the suspect (or problematic) test cases identified.

BRIEF DESCRIPTION OF THE DRAWINGS

The single FIGURE, FIG. 1, of the accompanying drawings will give a clear understanding as to how the invention can be implemented. FIG. 1 is a block diagram of a system according to the present invention.

DETAILED DESCRIPTION

The system 1 according to the invention shown schematically in FIG. 1 is intended for assisting the verification and operational validation of an algorithm chain.

According to the invention, said system 1 comprises at least the following modules, coordinated by an expert system (not shown):
- a module 2 for instrumenting the algorithm chain, which module is formed so as to automatically capture data that include at least some of the following data: interface data and internal algorithm data of the algorithm chain;
- a module 3 for automatically verifying functional rules, which module is connected by a link 4 (for transmitting data) to said instrumentation module 2;
- a learning module 5 which is connected by a link 6 (for transmitting data) to said verification module 3 and is formed so as to model by learning the constraints and algorithm criteria of the algorithm chain, taking into account validations carried out by a human operator, and data captured by the instrumentation module 2; and
- a detection module 7 which is connected by a link 8 (for transmitting data) to said learning module 5 and is formed so as to automatically detect bugs and operational problems in the algorithm chain using statistical learning means.

The system 1 further comprises a set 9 of backup files in which data of the algorithm chain are stored. The instrumentation module 2 is configured to read said backup files and to create queries about the data contained in said backup files, as shown by a double arrow 10.

Said system 1 further comprises:
- a display unit 11 which is connected by a link 12 to the instrumentation module 2 and is formed so as to display (by showing them for example on a screen (not shown) or printing them) data from the instrumentation module 2 so that an operator can take note of said data; and
- a data entry unit 13 making it possible for an operator to enter data in the system 1 and more particularly in the learning module 5 (as shown by a link 14 in FIG. 1) and in particular validations carried out by the operator.

The system 1 which comprises modules (or motors) carrying out automatic operations also assists the verification and validation of an algorithm chain (which shows regularity and replication phenomena).

Said system 1 makes it possible, in particular, to improve and simplify the validation of complex algorithms used in particular in the field of aeronautics. It makes it possible to assist an operator in detecting bugs more quickly (specifically design and implementation faults in an algorithm that are shown by anomalies in operation) and operational problems in the algorithm chain, which makes it possible for delays in and costs of a functional validation of the algorithm chain to be reduced.

The instrumentation module 2 of the algorithm chain makes it possible to capture the interface data and/or the internal algorithm data, which are relevant for the analysis and are generated when an algorithm chain is executed. When an algorithm chain (or algorithmic chain) is executed, the set of data (that has been input/output and relevant internal data of the algorithms) is stored in backup files (for example of the following types: csv, XML, database, etc.) of the set 9. The instrumentation module 2 is suitable for reading said files and creating different intelligent queries about the data contained in said backup files.

Furthermore, the verification module 3 (or rule module) makes it possible for simple operational rules to be verified, due to an inference module (not shown). The users of the system are responsible for writing the simple operational rules in a rules dictionary. Because of the expert system and the inference module, the module 3 combines the rules in order to determine if there are any breaches of one or more of said rules or if some elements require verification by the operator responsible for the tests.

Moreover, the learning module 5, from the field of artificial intelligence, allows modelling by learning the constraints and algorithm criteria. Said learning module 5 makes it possible to capitalise on the experience acquired during the validation of scenarios by human operators in order to increasingly automate said task.

In order to achieve this, said learning module 5 is based on an analysis of the operational structure of the algorithm chain in question and of the code, using metrics for quantifying the risk that one or another sub-function or portion of the code is a source of operational problems.

In order to carry out the learning of the module 5, a human operator has to provide (by means of the entry unit 13 in particular) a set of noted test cases on a set of criteria and constraints (by indicating for example if a scenario took place without fault or which aspects are at fault, etc.). This indication can take place interactively when (manual) operational validation is carried out by the operator. Because of said test basis and the set of inputs/outputs of the algorithms (and in particular of data of the module 2), the module 5 is suitable for identifying the problematic (or suspect) test cases, and for displaying to the user the relevant and/or suspect test cases, for example by means of an information presentation unit 19 described below or by means of the display unit 11.

The learning module 5 may comprise means based on one of the following features:
- support vector machines (SVM);
- "boosting";
- neural networks for supervised or non-supervised learning;
- decision trees;
- statistical methods, such as a Gaussian mixture model;
- logistic regression; and
- linear discriminant analysis.

Furthermore, the module 7 for automatically detecting bugs detects potential bugs in the algorithm chain because of the use of statistical learning technologies (or means). A statistical module which is taken into account creates a correlation of the data in question (in particular data captured from the algorithm chain) in order to determine general rules of evolution (or variation) of the outputs of the algorithms. If an excessively great variation in the outputs of an algorithm compared with a predetermined output is identified, a warning is sent to the operator (in particular by means of a warning unit 15 which is for example connected by a link 16 to the detection module 7). Said module 7 makes it possible to analyse the variation in the results of the algorithms in order to detect discontinuities or variations that appear to be abnormal.

Moreover, the system 1 further comprises a module 17 for classifying the suspect (or problematic) test cases.

When the system 1 identifies a set of problematic test cases, the classification module 17, which receives said cases via a link 18, organises said cases into groups. Said groups are designed so as to group the test cases in terms of similar operational errors. This makes it possible for the user of the system 1, to which said groups are presented using for example a display unit 19 connected by a link 20 to the classification module 17, to not be overwhelmed by an excessively large number of test cases by creating a quantitative pre-analysis of the scenarios. The results are ordered depending on their relevance and on metrics, and are presented in this way.

It should be noted that the present invention is different from formal methods, which make it possible to demonstrate by the logic that the source code fulfils all the operational requirements defined. Indeed, the system 1 makes it possible to capitalise on the experience of a user in order to simplify the validation of code that is not demonstrated.

In order to speed up the analysis by a human operator in the diagnostic phases, the system 1 comprises a module that is responsible for defining metrics and for the intelligent display of said metrics.

The system 1 thus combines a set of modules and services that can correlate, in a relevant manner, a large amount of information, and in particular:
- information directly shown in the data that are produced by algorithms in the algorithm chain;
- information calculated by automatic post-processing of said data;
- a priori information from analyses on the structure of the data and of the code; and/or
- information from a learning process: learning by interaction with the operator responsible for the validation tasks (learning the verification procedures) and learning some predictable phenomena in the behaviour of the algorithms where such phenomena exist.

Said system 1 thus makes it possible in particular:
- to more efficiently detect bugs in the flow of data that are used by algorithms in the algorithm chain;
- to assist operators responsible for the validation in analysing said data; and
- to increase reliability in the validation phase.

The invention claimed is:

1. A method executed by software instructions in a hardware processor for assisting verification and operational validation of an algorithm chain, said method comprising:
   an earlier step in which, when the algorithm chain is executed, a data set of the algorithm chain is stored in backup files;
   a) a step of instrumenting the algorithm chain, automatically capturing data that include at least some of the following data: interface data and internal algorithm data of the algorithm chain, step a) comprising reading the backup files and creating queries about the data contained in said backup files;
   b) a step of automatically verifying functional rules;
   c) a learning step for modelling by learning constraints and algorithm criteria of the algorithm chain, taking into account validations carried out by a human operator, and data captured, step c) comprising carrying out an analysis of a functional structure of the algorithm chain and an associated code, carrying out a learning process using noted test cases that are provided by the operator, and identifying relevant and suspect test cases;
   d) a step of automatically detecting bugs or functional problems in the algorithm chain using statistical learning means, step d) comprising carrying out a correlation of the captured data using statistical learning means in order to determine general rules of variations in algorithm outputs of the algorithm chain, and sending a warning if a variation greater than a given threshold of an algorithm output compared with a predetermined output is detected;
   e) classifying the suspect test cases into groups; and
   f) presenting the identified groups of suspect test cases to the operator.

2. The method according to claim 1, characterised in that step b) is configured to be able to detect a breach of the rules and to be able to detect if elements have to be verified by an operator.

3. The method according to claim 1, characterised in that step d) analyses the variation in algorithm results of the algorithm chain so as to detect, where necessary, discontinuities and abnormal variations.

4. The method according to claim 1, characterised in that it comprises a step of defining metrics and displaying said metrics.

5. A system having software instructions stored in a memory and executed by a hardware processor for assisting verification and operational validation of an algorithm chain, said system comprising a set of backup files in which data of the algorithm chain are stored, and, coordinated by an expert system, programmed to:
   instrument the algorithm chain, automatically capturing data that include at least some of the following data: interface data and internal algorithm data of the algorithm chain, the instrumentation module being configured to read the backup files and to create queries about the data contained in said backup files;
   automatically verify functional rules;
   model by learning constraints and algorithm criteria of the algorithm chain, taking into account validations carried out by a human operator, and data captured, comprising carrying out an analysis of a functional structure of the algorithm chain and an associated code, carrying out a learning process using noted test cases that are provided by the operator, and identifying relevant and suspect test cases; and
   automatically detect bugs or operational problems in the algorithm chain using statistical learning means, comprising carrying out a correlation of the captured data using statistical learning means in order to determine general rules of variations in algorithm outputs of the algorithm chain, a warning being sent if a variation greater than a given threshold of an algorithm output compared with a predetermined output is detected;
   classify the suspect test cases into groups; and
   present the identified groups of suspect test cases to the operator.

6. The system according to claim 5, characterised in that it further comprises a display unit.

7. The system according to claim 5, characterised in that it further comprises a data entry unit making it possible for the operator to enter data.

* * * * *